United States Patent [19]
Cogliano

[11] B 3,985,580
[45] Oct. 12, 1976

[54] WETTABLE POLYOLEFIN BATTERY SEPARATOR

[75] Inventor: Joseph Cogliano, Baltimore, Md.

[73] Assignee: W. R. Grace & Co., New York, N.Y.

[22] Filed: Nov. 18, 1974

[21] Appl. No.: 524,464

[44] Published under the second Trial Voluntary Protest Program on February 10, 1976 as document No. B 524,464.

[52] U.S. Cl. .............................. 264/121; 156/306; 264/211
[51] Int. Cl.² ........................................ H01M 2/14
[58] Field of Search ............ 136/146, 148; 156/306; 161/150; 264/211

[56] References Cited
UNITED STATES PATENTS

| | | | |
|---|---|---|---|
| 2,653,985 | 9/1953 | Philipps | 136/148 |
| 3,351,495 | 11/1967 | Larsen | 136/146 |
| 3,696,061 | 10/1972 | Selsor et al. | 136/146 |
| 3,702,267 | 11/1972 | Grot | 136/146 |
| 3,847,676 | 11/1974 | Palmer et al. | 136/148 |

Primary Examiner—Donald L. Walton
Attorney, Agent, or Firm—Elton Fisher

[57] ABSTRACT

A process for preparing a wettable battery separator comprising contacting a self supporting nonwoven mat of polyolefin fibers with a mixture of water, a surfactant, and colloidal silica, drying the mat, and compressing it.

4 Claims, No Drawings

WETTABLE POLYOLEFIN BATTERY SEPARATOR

DETAILED DESCRIPTION OF THE INVENTION

This invention is in the field of battery separators. More particularly it is in the field of wettable polyolefin battery separators. Still more particularly said invention is in the field of wettable polyolefin battery separators which retain their wettability over long periods of use.

Wettable polyolefin battery separators are well known to those skilled in the art. Unfortunately, prior art wettable polyolefin battery separators while readily wettable where new gradually lose their wettability with age and use of the storage battery of which they are a part. This is undesirable because as battery separators lose their wettability characteristic their ability to pass ions through their pores (the pores of the battery separators) also diminishes thereby to shorten the service life of the storage battery. Patents teaching polyolefin battery separators include but are not limited to the following U.S. Pat. Nos.

| | |
|---|---|
| 3,045,058 | (Martinak) |
| 3,216,864 | (Bushred et al) |
| 3,351,495 | (Larsen et al) |
| 3,354,247 | (Zehender et al) |

Fine polyolefin fibers of the type used in the process of this invention to prepare the improved battery separator of this invention, and methods for preparing such fibers are well known to those skilled in the art. Methods for preparing such fibers are taught by the following U.S. Pat. Nos.:

| | |
|---|---|
| 3,099,067 | (Merriam et al) |
| 3,549,734 | (Yasuda et al) |
| 3,595,245 | (Buntin et al) |
| 3,615,995 | (Buntin et al) |
| 3,684,415 | (Buntin et al) |
| 3,773,590 | (Morgan) |

Morgan's above mentioned U.S. Pat. No. 3,773,590 also teaches; (a) a method for preparing a mat of such fine polyolefin fiber; and (b) a method for preparing a battery separator from such mat. Said U.S. Pat. No. 3,773,590, in its entirety, is incorporated herein by reference.

U.S. Pat. No. 3,841,953 (Lohkamp et al) teaches a method for preparing fine polyolefin fibers and forming them into a mat. In said method a dyestuff and/or a nonfiber forming thermoplastic resin is incorporated into the polyolefin. The Lohkamp et al method can be used to form a mat of fine polyolefin fibers adapted for use in preparing the improved battery separator of this invention. However, where using said method to prepare a mat for use in preparing battery separator, it is generally preferred that both the dyestuff and the nonfiber forming thermoplastic components be omitted. Said Lohkamp et al patent (U.S. Pat. No. 3,841,953), in its entirety, is incorporated herein by reference.

An article entitled, "Ultrathin Microfiber Lining for Artificial Organs" by Miller et al which appeared on pages 728-733 of the Dec. 1973 issue of the Textile Research Journal also teaches a method for preparing fine polyolefin fibers.

SUMMARY OF THE INVENTION

In summary this invention is directed to an improvement in a process for preparing a porous compacted, wettable selfsupporting, nonwoven mat of polyolefin fiber useful as a battery separator comprising extruding a heated polyolefin through multiple die openings into a gas stream to attenuate the polyolefin into fibers having a diameter about 1–10 microns, collecting the fibers as a selfsupporting nonwoven mat having a thickness of 20–100 mils, contacting the selfsupporting nonwoven mat with an aqueous system consisting essentially of water and an amount of a surfactant effective for making the selfsupporting nonwoven mat wettable, drying the resulting wettable, selfsupporting, nonwoven mat, and compacting the dried, wettable, selfsupporting, nonwoven mat to form the porous compacted, wettable, selfsupporting, nonwoven mat of polyolefin fiber useful as a battery separator, said compacted mat having a thickness of about 10–40 mils and pores having a pore size of about 10–40 microns, the improvement comprising the presence in the aqueous system of an amount of colloidal silica effective for causing the compacted, wettable, selfsupporting, nonwoven mat to remain wettable after being washed with running water for about 16 hours.

DESCRIPTION OF PREFERRED EMBODIMENTS

In preferred embodiments of the invention recited in the above Summary:

1. The polyolefin is polypropylene.
2. The surfactant is an ester of a sulfonated dicarboxylic acid.
3. The porous, compacted, wettable, selfsupporting, nonwoven mat of polyolefin fiber has a thickness of 10–20 mils.

DETAILED DESCRIPTION OF THE INVENTION

It is an object of this invention to produce a compacted, wettable, selfsupporting, porous, nonwoven mat of fine polyolefin fiber, said mat being excellently adapted for use as a battery separator (or for making a battery separator therefrom, e.g., by cutting the compressed mat into sections of the appropriate size and shape and, if desired, adding ribs thereto). Such compressed mat is readily wettable by acidic aqueous electrolytes, by water, and by other aqueous electrolytes. Such compressed mat retains its wettability in service as a separator in a storage battery for periods of 3 years or longer.

Another object of this invention is to provide a process for making such battery separator from fine polyolefin fibers.

Battery separators formed from a nonwoven mat of polyolefin fiber can be made in various ways. One method of accomplishing this is set out in the above-mentioned U.S. Pat. No. 3,773,590 wherein a polylefin, preferably in pellet or crumb form, is added to a hopper and fed to an extruder in which the polyolefin is heated (e.g., to temperatures in the range 620°–800°F). After thermal treatment, the hot polyolefin is forced through the extruder by a drive motor into a die head, which head can contain a heating plate. The polyolefin is then forced out of a row of die openings in the die head into a gas stream which attenuates the polyolefin into fine fibers. The gas stream which attenuates the polyolefin is supplied through gas jets, said gas being a hot gas, preferably air. The rate of gas is controlled to a rate which will produce fine polyolefin fibers (i.e., fibers having an average diameter between 1 to about 10 microns). The thus formed fine fibers are collected as a selfsupporting mat on a collecting device such as a rotating drum. The mat produced by the melt blowing process has a basis weight of between 60 and 500 grams per square meter and a thickness which can vary between 20 and 200 mils. To produce a battery separator from the nonwoven mat produced by such melt blowing process, the mat must be compacted to obtain the desired thickness and porosity as well as the mechanical properties of strength and abrasion resistance. The nonwoven mat is compacted to a thickness of between about 10 and 40 mils, preferably by means of a thermal compacting operation using calendar rolls or a press to form a compact nonwoven mat of fixed thickness. The nonwoven mat can then be ribbed by conventional means such as by extrusion or embossing. Ribs extruded onto the mat can be of either the same material as the mat or other thermal plastic polymers and said ribs can be either solid or of foam structure as shown in U.S. Pat. No. 3,773,590.

On a continuous basis, a roll of polyolefin mat (which has not been compacted) can be passed through an aqueous system comprising water, a surfactant, and colloidal silica at a rate such that the aqueous system will contact most (or substantially all) of the exposed surfaces of the fine polyolefin fibers comprising the mat. The temperature of the aqueous system is preferably maintained below 90°C (or at 5°–75°C) and for optimum results at 25°–65°C. The thus treated mat is dried, and then compacted preferably using calender rolls having a temperature of 80°–150°C or using a press at a pressure of about 300–600 pounds per square inch absolute pressure and at about 80°–150°C to form a compressed mat having a thickness of about 10–40 mils (0.01–0.04 inch).

Contact time (residence time in the aqueous system comprising water, the surfactant, and the colloidal silical) is preferably about 0.1–2 minutes. However, contact time is not critical, and a contact time which will permit a substantial portion of the fibers comprising the mat to be contacted by said aqueous system will produce a substantial improvement in the wettability of a battery separator made from the mat and in the service life of a battery made with such separators. However, contact time must be sufficient to permit a substantial portion of the polyolefin fibers to come in contact with the aqueous system comprising water, surfactant and colloidal silica.

The particle size of the colloidal silica is not critical and generally ranges from $2 \times 10^{-5}$ to $5 \times 10^{-7}$ centimeter.

It is known to treat such nonwoven polyolefin mat with an aqueous system comprising water and a surfactant before compacting the mat to form the compacted mat thereby to render the resulting compacted mat wettable. However, as noted supra, battery separators prepared by such technique while readily wettable when new lose their wettability where placed in storage batteries (such as those used in automobiles) which are in service. I have found that battery separators that retain their wettability for 3 years or longer when in batteries which are in service can be prepared by the above procedure if it is modified by including colloidal silica in the aqueous mixture of water and surfactant used to render the mats (from which the separators are made) wettable. The amount of colloidal silica included in said aqueous system (and consequently the amount of silica applied to the mat before compacting) is not critical because a finite amount of colloidal silica produces a finite improvement in the time such battery separator retains its wettability in service. I generally prefer that the aqueous system comprising water, surfactant, and colloidal silica contain 1–10 grams of surfactant per liter and 30–300 grams of colloidal silica per liter.

Various polyolefins are operable herein as battery separators and include but are not limited to polypropylene, polyethylene, ethylene-butene copolymers, ethylene-propylene copolymers, ethylene-propylene terpolymers (e.g., ethylene-propylene and a minor amount of a nonconjugated diene such as a cyclic or aliphatic diene, e.g., hexadiene, dicyclopentadiene, ethylidene norbornene, and the like).

The compressed polyolefin web (or compressed self-supporting nonwoven polyolefin mat) of this invention has a pore size of about 10–40 microns which is an excellent size for use as battery separators.

The aqueous system comprising water, wetting agent (surfactant), and colloidal silica can be applied to the selfsupporting nonwoven mat of fine polyolefin fibers by dipping, spraying, pouring the aqueous system over the mat, or the like. The mat can then be dried, before compacting, during compacting or after compacting; equivalent results are obtained by each drying technique.

Drying is preferably conducted under a partial vacuum (e.g. 10 mm of mercury or less absolute pressure or 600 mm of mercury or less absolute pressure or at any pressure therebetween). The drying temperature should preferably be below the softening point of the polyolefin and generally below about 80°C.

Any anionic or nonionic surfactant can be used in preparing the aqueous system comprising water, the surfactant, and the colloidal silica. I generally prefer to use Aerosol OT (an ester of a sulfonated dicarboxylic acid), or a Pluronic (a surfactant prepared by the reaction of ethylene oxide and a polypropylene glycol), or dioctyl sodium sulfosuccinate as wetting agent (surfactant), but, as stated supra, any surfactant can be used with excellent results. The amount of surfactant used is not cirtical because a finite amount produces a finite amount of wettability in the compressed mate of fine polypropylene fiber and in a bettery separator made therefrom.

The colloidal silica can be prepared by any method which will produce colloidal silica. Preferred methods include, but are not limited to, grinding in a colloid mill, grinding in a fluid energy mill, or the like.

The ratio of water to surfactant, the ratio of water to colloidal silica, and the ratio of surfactant to colloidal silica in the aqueous system comprising water, surfactant, and colloidal silica is not critical.

It has been found that battery separators (made from a compacted, wettable, selfsupporting, nonwoven polyolefin mat) in a battery in normal service in an automobile driven about 15,000 miles per year will retain their wettability for at least 3 years of service if they are selected from a lot of separators which on testing by the "Washing Test" will retain their wettability for 15–16 hours. In said Washing Test the separator is imersed in water in a large beaker and water is passed into the bottom of the beaker at a rate of about 100 ml per minute. The water passes upward through the beaker

United States Patent [19]

Stachurski et al.

[11] 3,985,581
[45] Oct. 12, 1976

[54] CELL WITH CIRCULATING ELECTROLYTE

[75] Inventors: Zbigniew Stachurski, Brooklyn; Michel N. Yardney, New York, both of N.Y.

[73] Assignee: Yardney Electric Corporation, Pawcatuck, Conn.

[22] Filed: July 31, 1970

[21] Appl. No.: 64,133

Related U.S. Application Data

[63] Continuation of Ser. No. 597,954, Nov. 30, 1966, abandoned.

[52] U.S. Cl. ............................... 429/51; 204/273; 429/67
[51] Int. Cl. .................. H01m 11/00; H01m 31/02; C22d 1/02
[58] Field of Search ............ 136/160, 159, 140, 141

[56] References Cited
UNITED STATES PATENTS

| | | | |
|---|---|---|---|
| 543,680 | 7/1895 | Epstein | 136/141 |
| 734,549 | 7/1903 | Halsey | 136/160 |
| 2,070,612 | 2/1937 | Niederreither | 136/86 |
| 2,692,904 | 10/1954 | Strauss | 136/30 |
| 2,744,860 | 5/1956 | Rines | 204/222 |
| 2,832,813 | 4/1958 | Peters | 136/30 |
| 2,946,945 | 7/1960 | Regnier | 136/161 |
| 3,083,253 | 3/1963 | Sundberg | 136/160 |
| 3,247,024 | 4/1966 | Tamminen | 136/140 |
| 3,318,578 | 5/1967 | Branson | 259/1 |

FOREIGN PATENTS OR APPLICATIONS

| | | | |
|---|---|---|---|
| 10,536 | 7/1884 | United Kingdom | 136/141 |

OTHER PUBLICATIONS

Fink and Linford: The Effect of the Speed of Rotation on the Electrode Potentials of Copper and Zinc (Transactions of the Electrochemical Society, vol. 72, pp. 461–472) (1937).

*Primary Examiner*—L. Dewayne Rutledge
*Assistant Examiner*—Peter D. Rosenberg
*Attorney, Agent, or Firm*—Donald E. Nist

[57] ABSTRACT

To prevent the formation of internal short circuits between electrodes of a rechargeable electrochemical cell, the electrolyte is maintained in continuous motion at least during charging when, in the case of an air-depolarized cell with a positive oxygen electrode and a negative zinc electrode, an air stream is introduced into a cylindrical cell casing through a multiplicity of orifices in a generally tangential direction and at increasing distances from the housing axis to impart rotation about that axis to the liquid; upon the subsequent discharge, a valve redirects the air stream into a compartment separated from the electrolyte by the oxygen electrode.

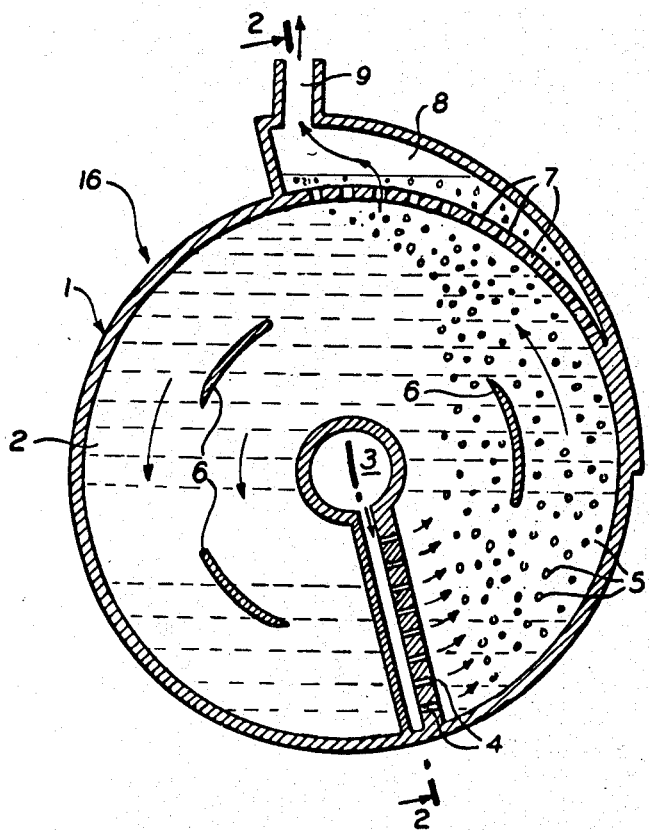

7 Claims, 7 Drawing Figures